United States Patent [19]

Bieber

[11] Patent Number: 4,575,148
[45] Date of Patent: Mar. 11, 1986

[54] VAN TOP

[76] Inventor: Leonard J. Bieber, 54578 Suburban Dr., Elkhart, Ind. 46516

[21] Appl. No.: 698,032

[22] Filed: Feb. 4, 1985

[51] Int. Cl.⁴ ............................................. B62D 25/06
[52] U.S. Cl. .................................... 296/210; 296/156; 29/401.1
[58] Field of Search ....................... 296/210, 156, 157; 29/401.1

[56] References Cited

U.S. PATENT DOCUMENTS

| | | | |
|---|---|---|---|
| 1,943,588 | 1/1934 | Dinstbir | 296/210 |
| 3,731,970 | 5/1973 | Frank et al. | 296/156 |
| 3,905,638 | 9/1975 | Persico | 296/156 |
| 4,289,348 | 9/1981 | Greene | 296/157 |

Primary Examiner—Robert R. Song
Attorney, Agent, or Firm—Thomas J. Dodd

[57] ABSTRACT

A van top having an internal circumferential mounting flange overlying and secured to the van roof by internal fasteners.

3 Claims, 3 Drawing Figures

VAN TOP

SUMMARY OF THE INVENTION

This invention relates to a van top having an integral mounting flange.

Previously, van tops were mounted to the van frame by external mounting screws which were driven through the top into the frame at the lower portion of the top. Since the screws were driven from the outer side of the top, they were visible to an observer and created a potential water leak.

The van top of this invention includes an internal mounting flange which overlies an interior roof section and drip rail of the van frame. The top is secured by driving internal mounting screws through the interior roof section and mounting flange, which conceals the mounting screws and provides for a more aesthetically pleasing and water proof construction.

Accordingly, it is an object of this invention to provide for a novel top which is for a van.

Another object of this invention is to provide for a van top which has an integral mounting flange for fastening the top to the van frame.

Another object of this invention is to provide for a van top which is aesthetically pleasing.

Still another object of this invention is to provide for a van top which effectively seals the top against leakage.

Other objects of this invention will become apparent upon a reading of the following description.

BRIEF DESCRIPTION OF THE DRAWINGS

A preferred embodiment of the invention has been chosen for purposes of illustration wherein.

DESCRIPTION OF THE PREFERRED EMBODIMENT

Figure 1:
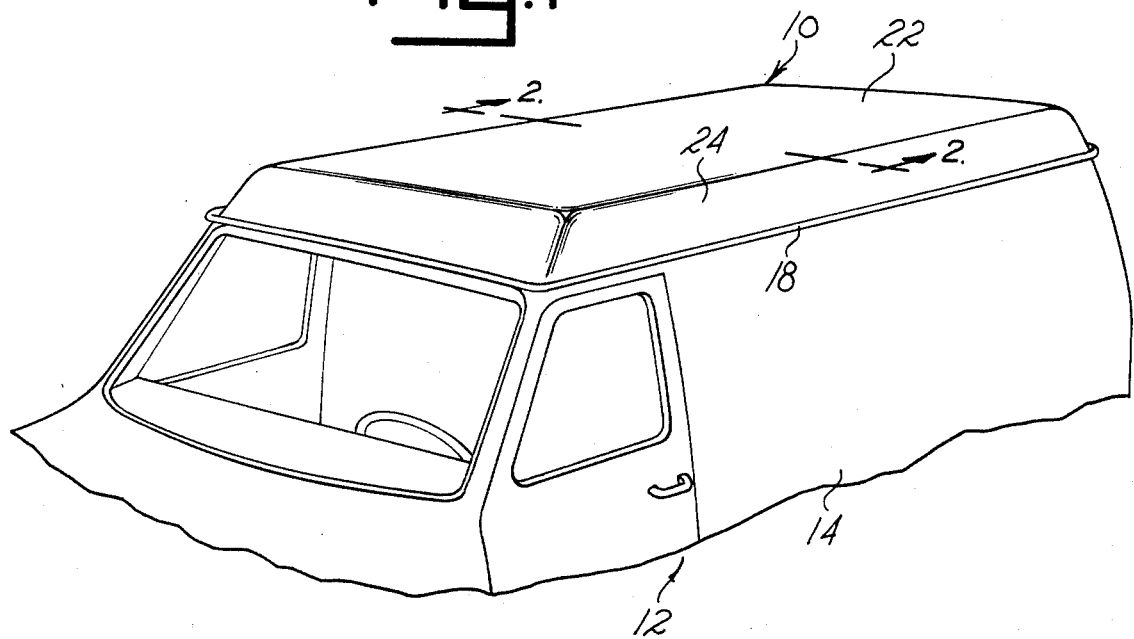
FIG. 1 is a fragmentary perspective view of a van having the novel van top of this invention.

The preferred embodiment herein described is not intended to be exhaustive or to limit the invention to the precise form disclosed. It is chosen and described to explain the principles of the invention and its application and practical use to enable others skilled in the art to utilize the invention.

The van top 10 shown in the drawings is adapted for use with a van 12. Van 12 includes a rigid side wall 14 and an overlying roof 16. The juncture of wall 14 and roof 16 is formed into a drip rail 18.

Top 10 includes a roof part 22 having a downturned circumferential side part 24. An integral concave mounting flange 26 extends upwardly from the lower edge of top side part 24 under roof part 22. Top 10 may be fored of fiberglass.

Figure 2:
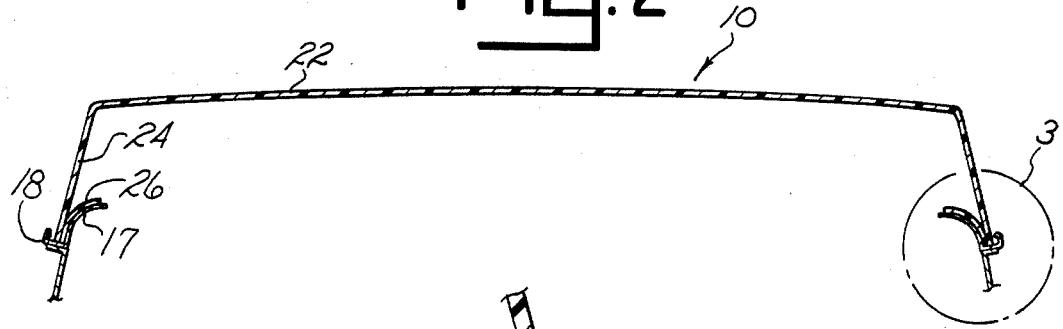
FIG. 2 is a fragmentary sectional view taken along line 2—2 of FIG. 1.
Figure 3:
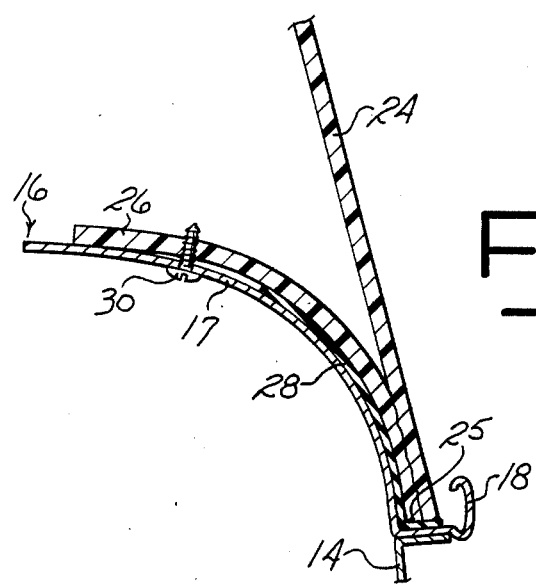
FIG. 3 is an enlarged detail view of the mounting flange enclosed within circle 3 of FIG. 2.

Van 12 is prepared for top 10 by having the center section of its roof 16 cut out or removed to leave a circumferential roof section 17. Top 10 is placed over roof 16 of the van with its mounting flange 26 complementally overlying van roof part 22 as shown in FIGS. 2 and 3. A seal member 28 is disposed between top mounting flange 26 and roof part 22 and preferably under the lower peripheral edge 25 of the top within drip rail 18. Fasteners, such as mounting screws 30, are driven through van roof part 22 and top mounting flange 26 at spaced intervals to firmly secure the top to the van roof.

It is to be understood that the invention is not limited to the above-given details, but may be modified within the scope of the appended claims.

I claim:

1. In a van including an exterior side wall and an integral roof, a top covering said roof section, the improvement wherein said top includes a roof part and a lower peripheral edge and an internal inturned mounting flange extending upwardly from adjacent said top lower edge, said top mounting flange overlying said van roof section, and means securing said top mounting flange to said van roof section below said top roof part.

2. The van of claim 1 and a seal member disposed between said top mounting flange and said van roof section.

3. The van of claim 2 wherein said van includes a drip rail between its said side wall and roof, said top lower edge extending into said van drip rail, said seal member disposed between said top lower edge and van drip rail.

* * * * *